United States Patent Office 3,289,167
Patented Nov. 29, 1966

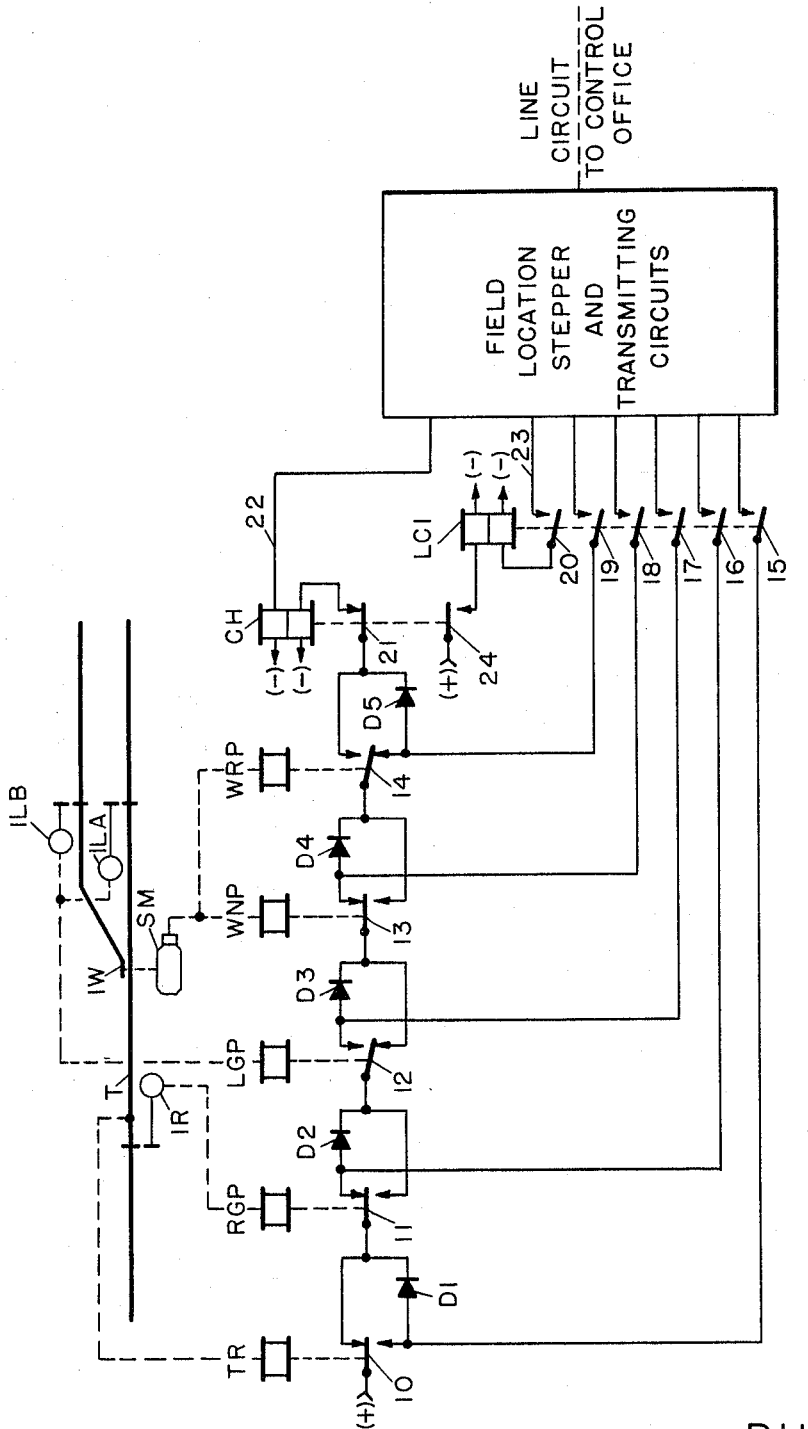

3,289,167
CONTROL CIRCUIT FOR TRANSMITTING CODE INDICATING POSITION OF CONDITION RESPONSIVE RELAYS
Peter H. Swane, Rochester, N.Y., assignor to General Signal Corporation
Filed Sept. 19, 1962, Ser. No. 224,624
4 Claims. (Cl. 340—163)

This invention relates generally to code communication apparatus of centralized traffic control systems for railroads and more particularly relates to a control circuit for combining the automatic field start and indication transmitting functions of such a system on one set of dependent relay contacts or similar devices.

Current code communication systems for centralized traffic control such as disclosed in Pat. No. 2,626,314 issued to N. B. Coley on January 20, 1953, provides code transmitting apparatus at each of the various field locations for transmitting to the control office indications which reflect the position of the contacts of a group of suitable signal and switch repeater relays and a track relay which are energized and deenergized in accordance with the position of a track switch, the condition of the wayside signals and the occupancy or non-occupancy of the track section.

Associated with this group of repeater relays is a so called "change" relay and a "code make-up" relay. The "change" relay is normally energized by a stick circuit serially connected to a source of energy through a first group of front and back contacts of the signal and switch repeater relays and the track relay. The "code make-up" relay is energized in accordance with the deenergization of the "change" relay which is initiated by the momentary interruption of the "change" relay control circuit by a change of position of at least one of said first set of contacts of the aforementioned repeater relays. The elements of any particular indication code applied to the field stepper and the transmitting circuits by the energized "code make-up" relay for transmission from the field location to the central office are determined by the respective positions of a second set of contacts of the repeater relays responsive to the equipment governing train movement over the track layout.

It is often found that when a code communication system of the type discussed herein is to be employed in conjunction with presently existing traffic control devices at a field location or to supersede an already existing system that the repeater relays for the traffic controlling devices have an insufficient number of contacts to effect operation of the field indication transmitting equipment and there is no mechanical provision for economically adding other contacts to the repeater relays and therefore a complete substitution of the relay must be made.

This problem is by no means restricted to a situation where the code communication system is used for centralized control of railway traffic or where initial operation of the indication transmitting equipment is effected in response to the deenergization and energization of relays which repeat the position or condition of the field located devices. Such problems are equally prevalent when the position of any bilateral or two position device is to be indicated, such as micro-switches, when the code communications system is being used for the centralized control of fuel flow through a pipe line, or for any other such supervisory control of systems involving electro mechanical devices external to the code communication system.

Generally speaking, and without attempting to define the nature and scope of the present invention, it is proposed to provide an improved control circuit for code type communication systems of the character described which utilizes electrically unilateral or asymmetric devices to combine on one set of dependent contacts of relays or other binary repeater devices, the automatic field start and the transmission of indications functions of the repeaters of the field located equipment to be indicated.

Another object of the present invention is to provide an improved control circuit of the character described where the code elements of a given code transmitted indication cycle reflecting the position or condition of the field located traffic governing equipment in a centralized traffic control system are determined by the selective placement of electrically unilateral or assymmetric devices in circuit with each binary repeater device of the field located equipment in one of its terminal positions.

Other objects, characteristic features and advantages of this invention are more conveniently considered hereinafter in connection with a detailed description of one specific embodiment of the invention.

The drawing illustrates diagrammatically the invention as applied to a typical track layout for a railroad passing siding comprising a single track switch 1W assumed to be located at the end of a passing siding of a single track railroad. The track switch 1W is assumed to be operated to normal and reverse positions by the usual power operated switch machine SM. The signal 1R governs traffic movement from left to right and the signals 1LA and 1LB govern traffic moving from right to left, by displaying a stop or proceed indication.

Also, illustrated are suitable signal repeater relays RGP and LGP, switch repeater relays WNP and WRP, anl a track relay TR which reflects the occupancy or nonoccupancy of the conventional track section T. These repeater relays are shown without their specific circuits being illustrated, as the control circuits for these relays are well known to those familiar with the art.

Associated with this group of repeater relays is a "change" relay CH and a "code make-up" relay LC1 which respectively initiate the code communication system into a cycle of operation and apply the elements of the code to field location coding and transmitting apparatus.

The CH relay is shown as being a normally energized dual winding neutral relay. Its energizing circuit originates at a cource of positive potential which is supplied by means of a stick circuit to the lower winding of the CH relay through the front and back contacts of the signal and switch repeater relays and the track relay. The LC1 relay is energized in accordance with the deenergization of the CH relay and applies the indications represented by the positions of the contacts of the track relay and the signal and switch repeater relay to the indication buses. The CH relay is subsequently reenergized by a stepper relay circuit during the second step of the indication cycle, by the application of energy to its upper winding over the wire 22. The LC1 relay remains picked up throughout the indication cycle and is restored to its normally deenergized position by the removal of positive energy from wire 23, when the stepper relays are picked up after the indication cycle has been completed.

As the present invention is not patentably concerned with this part of the operation of a centralized traffic control system, the field station coding apparatus has been shown in block form and the field office equipment has not been shown. It is sufficient to state that during an appropriate time during the operating cycle, the field location stepper and transmitting circuits are rendered operative to transmit a code; the elements of which are indicative of the then existing condition of the signal repeater relays RGP and LGP, the track switch repeater relays WNP and WRP and the track relay TR by reason of the fact that the contacts associated with these relays in conjunction with the unilateral or asymmetric devices, e.g. semiconductor diodes D1, D2, D3, D4 and D5, govern the energization of the indication transmission control circuits which determine the character of the indication code elements. For a detailed description of the field location stepper and transmitting circuits and the control office equipment reference can be made to the N. B. Coley, Pat. No. 2,626,314 dated January 20, 1953.

In order to illustrate the operational aspects of this embodiment of the present invention, let us assume that the code elements are in the form of "marks" and "spaces" and, that a "mark" is determined by the application of positive energy to code buses of the field location stepper and transmitting circuits and that a "space" is determined by the absence of positive energy on the above-mentioned code buses of the field located stepper and transmitting circuits. Under these circumstances, if the track section T associated with the track relay TR becomes occupied, the relay TR would become deenergized, dropping its front contact 10. The momentary interruption of positive energy during the cross-over time of the contact 10 from front to back would open the stick circuit for the relay CH, thereby completing an obvious circuit via back contact 24 of relay CH for energizing the relay LC1. The energization of the relay LC1 closes its front contacts 15, 16, 17, 18, 19 and 20. With relay LC1 picked up, the closure of back contact 10 of relay TR will apply a "mark" to the code busses as the first step of the indication code in accordance with the application of positive energy over back contact 10 of relay TR and front contact 15 of relay LC1. Similarly, with back contact 10 of relay TR closed and front contact 11 of relay RGP closed, a "mark" would be applied to the second step of the indication code in accordance with the application of positive energy from the source indicated in the diagram being applied over back contact 10 of relay TR, the semiconductor diode D1 in the forward direction, front contact 11 of relay RGP and closed front contact 16 of relay LC1. However, a "space" would be applied as the third element of the indication code in accordance with the closure of back contact 12 of relay LGP and the positioning of the diode D3. Under these circumstances, positive energy from the indicated source would be applied over back contact 10 of relay TR, the semiconductor diode D1 in the forward direction, front contact 11 of relay RGP, the semiconductor diode D2 in the forward direction, back contact 12 of LGP. However, due to the positioning of the semiconductor diode D3 in the reverse direction with respect to the connecting wire for front contact 17 of relay LC1, no positive energy would be applied to the code bus and consequently the third element of the indication code would be a "space." These same considerations, as determined by the position of respective contacts 13 of relay WNP and 14 of relay WRP, and the position of the semiconductor diodes D4 and D5, are effective with respect to the fourth and fifth elements of the code. With respect to relay WNP, a "mark" would be transmitted as the fourth element of the indication code when front contact 13 is closed and a "mark" would be transmitted as the fifth element of the indication code when the back contact 14 of relay WRP is in the closed back position.

The combination of "marks" and "spaces" available can be varied in the same manner as can be done in the circuit shown in the drawing by positioning the semiconductor diodes D1–D5 inclusive in the upper or lower contacts of the relays TR, RGP, LGP, WNP, and WRP. For example, if it is desired to establish a "space" as the fifth element of the indication code when back contact 14 of relay WRP was closed it is merely necessary to insert the semiconductor diode D5 and the connecting wire in the upper contact of the relay WRP in a manner similar to that shown for the relay WNP.

Having thus shown and described one specific embodiment of the present invention, it is desired to be understood that this has been done for the purpose of showing how this invention may be applied rather than illustrating its scope or the exact construction preferably employed in practice. It is to be further understood that the specific construction shown is susceptible of considerable modification to adapt the invention to the particular code communication system to which it may be applied, all without departing from the spirit or scope of the present invention except as limited by the appended claims.

What I claim is:

1. In a code communication system for transmitting a code indicative of the existing position of a two-position device, the combination of,
   (a) an energy source,
   (b) a switching circuit means including a movable contact closing element connected to said energy source and operable between first and second contacts to repeat the existing position of said two-position device,
   (c) code initiating control circuit means connected to each of said first and second contacts to be energized from said source when said movable contact closing circuit means is closing either of said first or second contacts for initiating a transmission cycle when deenergized each time the existing position of said two-position device is changed,
   (d) code selecting circuit means adapted to be connected to only one of said first and second contacts to be selectively energized or deenergized for representing a distinctive code to be transmitted during said transmission cycle indicative of the existing position of said two-position device, and
   (e) unilateral conducting circuit means connected between said first and second contacts effective to prevent said code selecting circuit means from being energized from said source while the other of said contacts is being closed, but at the same time being effective to permit said initiate control circuit means to be energized if either of said first or second contacts are closed.

2. The invention according to claim 1 wherein said device is a two-position relay.

3. The invention according to claim 1 wherein there is a plurality of two-position devices to have their positions indicated and the code initiating means includes contacts of all of the devices connected in series to initiate the code communication system upon a change in the position of any one of the devices.

4. The invention according to claim 3 wherein said code initiating control circuit means includes a relay effective when deenergized to initiate an indication cycle of operation and being normally energized over a stick circuit including one of its own front contacts, a source of energy, and each pair of said contacts connected electrically in series.

(References on following page)

References Cited by the Examiner

UNITED STATES PATENTS

| | | | |
|---|---|---|---|
| Re. 23,571 | 11/1952 | Clutts et al. | 340—152 |
| 2,172,596 | 9/1939 | Saunders et al. | 340—362 |
| 2,411,375 | 11/1946 | Jackel | 340—163 |
| 2,649,502 | 8/1953 | Odell | 340—354 |
| 2,679,034 | 5/1954 | Albrighton | 340—163 |
| 2,750,584 | 6/1956 | Goldfischer | 340—176 X |
| 2,914,710 | 11/1959 | Johnson et al. | 340—168 |
| 2,914,749 | 11/1959 | Vande Sande et al. | 340—362 X |
| 3,035,248 | 5/1962 | Grose et al. | 340—150 X |

OTHER REFERENCES

Publication: Arithmetic Operations in Digital Computers, R. Richards, Van Nostrand Co., 1955, p. 44 relied on.

THOMAS B. HABECKER, *Acting Primary Examiner.*

H. I. PITTS, *Assistant Examiner.*